12 Claims, 6 Drawing Figures

United States Patent [19]
Fuller

[11] 4,257,154
[45] Mar. 24, 1981

[54] METHOD OF VENTING PNEUMATIC TIRES AND AN AIR GUIDE AND INSERT TOOL THEREFOR

[76] Inventor: John C. Fuller, 6615 Churchill Dr., Gladstone, Oreg. 97027

[21] Appl. No.: 11,508

[22] Filed: Feb. 12, 1979

[51] Int. Cl.³ .................. B23P 11/00; B23P 19/00; B26F 1/00; B60C 15/00
[52] U.S. Cl. ........................ 29/432; 29/235; 29/450; 29/798; 30/361; 152/362 R; 152/330 R; 156/87; 156/398
[58] Field of Search ............ 29/432, 235, 450, 433, 29/798; 30/361, 358; 83/868, 866; 156/87, 398; 81/15.2, 15.7; 152/362 R, 368, 370, 330 R

[56] References Cited

U.S. PATENT DOCUMENTS

| | | | |
|---|---|---|---|
| 581,641 | 4/1897 | Wolf | 152/370 X |
| 2,727,554 | 12/1955 | Westfall | 152/370 |
| 2,920,515 | 1/1960 | Mays | 152/370 X |
| 3,013,454 | 12/1961 | Gruber | 81/15.7 |
| 3,107,565 | 10/1963 | Hermanns | 83/868 |
| 3,388,451 | 6/1968 | Holder | 81/15.7 X |
| 3,448,520 | 6/1969 | Fuller et al. | 30/361 |
| 3,611,549 | 10/1971 | Pope | 29/433 |

Primary Examiner—Charlie T. Moon
Attorney, Agent, or Firm—Oliver D. Olson

[57] ABSTRACT

The bead area of a pneumatic tire is vented of trapped air by inserting an air guide into the bead area from the outer side of the tire adjacent the tire wheel rim area, whereby the trapped air is guided from the bead area along the air guide to the outer side of the tire. The air guide is an elongated flexible member provided with an enlarged head at its inner end. It is inserted into the tire by an elongated hollow shaft provided with an exterior spiral screw thread. The air guide is inserted into the hollow bore of the shaft, with the enlarged head of the guide abutting one end of the shaft. The opposite end of the shaft is secured to the chuck of a conventional low speed reversible electric drill. The enlarged head of the air guide is provided with a plurality of spaced, outwardly projecting stops which serve to prevent retraction of the head and air guide from the tire. When the enlarged head has been inserted to the desired depth in the bead area, the drill is reversed to retract the screw threaded shaft. The enlarged head remains in the bead area and the elongated flexible air guide extends from the enlarged head to the outer surface of the tire. Excess length of the air guide is cut away at the tire surface.

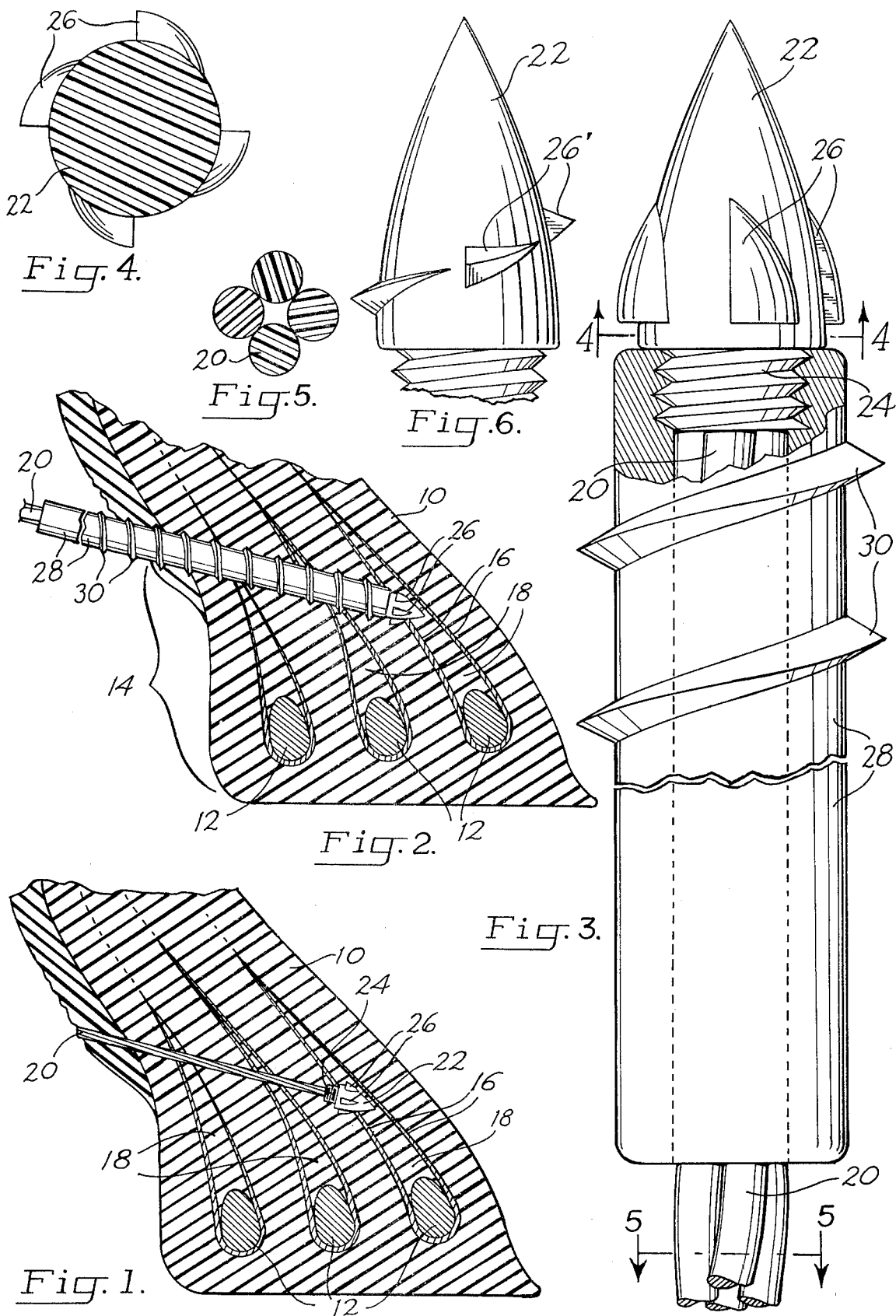

METHOD OF VENTING PNEUMATIC TIRES AND AN AIR GUIDE AND INSERT TOOL THEREFOR

BACKGROUND OF THE INVENTION

This invention relates to pneumatic tires, and more particularly to the venting of the bead area of trapped air under pressure to prevent ply separation and destruction of the tire.

U.S. Pat. No. 3,448,520 issued jointly to this applicant and others, explains the need for venting the bead area of pneumatic tires and describes an awl-type piercing tool for forming air vent opening in the tire. This procedure is quite satisfactory for small tires of the passenger car type and others provided with up to three bead clusters, but is not completely satisfactory for the much larger tires utilized by heavy, off-road vehicles and large aircraft and containing up to five or more bead clusters.

The aforementioned patent also illustrates a porous member extending from the bead area to the outer side of the tire for allowing air under pressure to pass through the porous member and escape to the atmosphere. However, the patent discloses that the porous member is installed in the tire during its manufacture, before final curing of the rubber. This adds significantly to the time and cost of tire production. Furthermore, it provides no means by which to overcome the problem in tires already manufactured.

SUMMARY OF THE INVENTION

In its basic concept, this invention provides for the venting of the bead area of a completely manufactured pneumatic tire by inserting an elongated flexible air guide, having an enlarged head at one end into the tire, enlarged head first, the air guide extending outward from the bead area to the outer side of the tire adjacent the wheel rim area.

It is by virtue of the foregoing basic concept that the principal objective of this invention is achieved; namely, to overcome the aforementioned limitations and disadvantages associated with the installation of the porous member disclosed in U.S. Pat. No. 3,448,520 and to provide for the venting of completely manufactured tires.

Another object of this invention is to provide a simplified method of venting pneumatic tires by use of an inexpensive air guide and a portable insert tool of simplified construction.

A specific objective of this invention is the provision of a simplified and economical method and apparatus for venting the multiple bead areas of completely manufactured, large size tires utilized by off-road vehicles and aircraft.

The foregoing and other objects and advantages of this invention will appear from the following detailed description, taken in connection with the accompanying drawing of a preferred embodiment.

BRIEF DESCRIPTION OF THE DRAWING

FIG. 1 is a fragmentary sectional view of a three bead cluster tire showing an air guide installed therein in accordance with this invention.

FIG. 2 is a fragmentary sectional view, similar to FIG. 1, showing the manner of use of the insert tool for inserting the air guide to the position illustrated in FIG. 1.

FIG. 3 is a foreshortened longitudinal view, on an enlarged scale, of an air guide and insert tool embodying features of this invention, a portion being broken away to disclose internal structural details.

FIG. 4 is a sectional view taken on the line 4—4 in FIG. 3.

FIG. 5 is a sectional view taken on the line 5—5 in FIG. 3.

FIG. 6 is a fragmentary longitudinal view showing a modified form of stop on the air guide head component.

DESCRIPTION OF THE PREFERRED EMBODIMENT

FIGS. 1 and 2 illustrate a wheel-mounting portion of a tire 10 provided with three transversely spaced reinforcing bead clusters 12 in the wheel flange portion 14 of the tire, each bead being disposed between adjacent layers of cord material 16 confined between the plies of rubber which constitute a conventional tire. The adjacent cord layers associated with each bead define an air collecting space 18 adjacent the bead, and it is these spaces that are to be vented in order to prevent separation of the plies and consequent destruction of the tire.

In accordance with this invention, the bead area of a pneumatic tire is vented to the atmosphere by means of an air guide member which is inserted into the tire to extend from the inner bead bundle area outwardly to the outer side of the tire adjacent the wheel flange area, i.e. radially inward of the area of the tire which abuts and is sealed by the flange of the mounting wheel. The air guide member thus serves as one or more channels by which air under pressure within the bead area is guided to the atmosphere.

Referring to the drawings, the air guide member illustrated comprises an elongated, flexible air guide 20 composed of a plurality of strands of synthetic thermoplastic resin, such as nylon, collected together in spiral fashion, in the manner of a rope. To one end of this elongated flexible rope is secured an enlarged head, i.e. a head having a larger cross sectional dimension than the cross sectional dimension of the rope. In the embodiment illustrated, the enlarged head is made of synthetic thermoplastic resin and is produced by conventional molding technique in which one end of the elongated rope is imbedded in and bonded integrally to it.

The enlarged head is provided with an outer section 22 which tapers forwardly to a point, and an inner shank section 24 of reduced diameter provided with an external thread. The tapered forward portion of the head also is provided with a plurality of outwardly projecting spaced stops 26. If desired, the stops may be in the form of interrupted segments of a screw thread, by which to facilitate insertion of the enlarged head into the bead area of a tire, as explained more fully hereinafter.

A tool is provided for inserting the air guide member into the bead area of a tire. As best illustrated in FIG. 3 of the drawing, the tool comprises an elongated hollow shaft 28 the central bore of which is proportioned to receive freely therein the elongated flexible air guide 20. One end of the hollow shaft is provided with an enlarged threaded bore segment proportioned to receive the threaded shank portion 24 of the enlarged head. By this means the enlarged head is secured removably to that end of the shaft, the shoulder between the threaded shank and the enlarged forward portion of the head abutting the confronting end of the shaft.

The elongated shaft 28 is provided with an external, outwardly projecting spiral screw thread 30 over a substantial portion of its length. The pitch of the screw thread preferably is quite shallow, to facilitate insertion of the shaft into the tire. The rearward end portion of the shaft is devoid of the external screw thread for a distance sufficient to enable it to be secured in the chuck of a conventional reversible electric drill, or other suitable rotary drive source, capable of being rotated at low speed, i.e. not more than about 500 rpm. Such low speed rotation of the shaft is required in order to minimize the generation of heat and consequent reversion of the rubber of the tire and sealing of the air guide to the rubber, with resultant obstruction of air flow from the bead area to atmosphere.

As previously explained, the method and apparatus of this invention has particular utility in the venting of large pneumatic tires utilized by heavy off-road vehicles and aircraft. Although such tires generally have up to six or more bead bundles, the drawing illustrates a tire having only three such bundles, merely for purposes of simplification.

The procedure for installing the air guide member in the position illustrated in FIG. 1, is as follows: The elongated flexible air guide portion 20 thereof is slipped into the hollow screw threaded shaft 28, from the threaded end portion thereof, and the threaded shank 24 of the enlarged head is screwed into the threaded end portion of the shaft until the shoulder of the head abuts the confronting end of the shaft. The opposite end of the shaft then is secured in the chuck of a conventional reversible electric drill capable of rotation at a low speed, as previously explained.

With the drill operating at low speed in the screw feed direction, the pointed forward end of the enlarged head 22 is pressed into the tire adjacent the tire wheel flange area, until the screw thread 30 of the tool shaft engages the tire. In the event the stops 26 are provided as interrupted screw thread segments 26', as illustrated in FIG. 6, they assist in drawing the enlarged head into the tire, after which the screw thread 30 engages the tire. In either case, the tool is caused to be screwed into the tire, preceded by the head 22.

When the insert tool shaft 28 has penetrated the tire to the depth predetermined to bring the enlarged head 22 of the air guide member to the innermost air collecting space 18 associated with the innermost head cluster, the rotation of the drill is reversed. Because of the space between the ends of the stops 26 or screw thread segments 26' on the enlarged head and the continuous screw thread 30 on the insert tool shaft, the rubber of the tire prevents retraction of the enlarged head as the screw threaded shaft is unthreaded from the tire. Accordingly, the air guide member is retained within the tire, in the manner illustrated in FIG. 1. Any excess length of the flexible air guide 20 projecting outwardly beyond the outer surface of the tire, is cut away.

The foregoing procedure is repeated as many times as is necessary to install the desired number of air guide members at circumferentially spaced positions about both the inner and outer bead areas of the tire. The number generally ranges from about eight to about twenty-four, depending upon the size of the tire.

From the foregoing it will be appreciated that the present invention provides a simplified method and apparatus for venting the bead areas of pneumatic tires, particularly of the large type utilized by off-road vehicles and aircraft. The air guide member is capable of mass production at very low cost. The insert tool also is of simplified construction for economical manufacture, and is usable with an inexpensive, portable electric reversible drill available commercially at low cost. Thus, the method and apparatus may be utilized in the field, as required, as well as in tire centers. In any case, the method and apparatus enable the effective venting of completely manufactured tires, with speed and facility.

It will be apparent to those skilled in the art that various changes may be made in the size, shape, type, number and arrangement of parts described hereinbefore. For example, the spiraled strands making up the elongated flexible air guide component 20 of the air guide member may be replaced by elongated flexible structures of different configuration. For example, the strands may be braided, rather than spiraled, or they may be straight. The air guide component may be a single hollow or solid member of flexible material. Although it may be porous, it is preferred that it be non-porous and of a material that does not wick or otherwise draw moisture back into the tire, with consequent deterioration of steel utilized in the construction of the tire.

As another example of modification, the external stops 26 or 26' on the enlarged head and screw thread 30 on the elongated hollow shaft may be omitted, by drilling a hole into the tire to the desired depth in the bead area and then merely pushing the air guide member through the drilled hole by means of a hollow shaft, without rotating the latter. When the enlarged head of the air guide member reaches the inner end of the drilled hole, the hollow shaft is merely retracted, leaving the air guide member embedded in the tire. These and other changes may be made, as desired, without departing from the spirit of this invention.

Having now described my invention and the manner in which it may be used, I claim:

1. The method of venting the bead area of a pneumatic tire, comprising:
   (a) providing an elongated air guide of flexible material having an enlarged piercing head at one end, and
   (b) inserting the air guide, enlarged head first, into the tire from the outer side adjacent the wheel flange area to be vented, the air guide extending outwardly from the head to the outer surface of the tire.

2. The method of claim 1 including:
   (a) providing an elongated insert tool arranged to bear against the enlarged piercing head of the air guide,
   (b) inserting the tool, with the enlarged piercing head first, into the tire from the outer side adjacent the wheel flange area to the bead area to be vented, and
   (c) retracting the tool from the tire, whereby the air guide is retained in the tire.

3. The method of claim 1 including:
   (a) providing an elongated hollow shaft,
   (b) inserting the air guide freely into the hollow shaft with the enlarged piercing head abutting one end of the shaft,
   (c) inserting the hollow shaft, with the enlarged piercing head first, into the tire from the outer side adjacent the wheel flange area to the bead area to be vented, and
   (d) retracting the hollow shaft from the tire, whereby the air guide is retained in the tire.

4. The method of claim 1 including:

(a) providing the enlarged piercing head with a plurality of outwardly projecting stops,
(b) providing an enlarged hollow shaft having an exterior screw thread and adapted for attachment at one to a rotary drive,
(c) inserting the air guide freely into the hollow shaft with the enlarged piercing head abutting the end of the shaft opposite the rotary drive,
(d) inserting the piercing head into the tire and engaging the screw thread against the tire while rotating the drive in the direction to screw the head and shaft into the tire from the outer side thereof adjacent the wheel flange area to the bead area, and
(e) reversing the rotation of the drive to retract the shaft, whereby the air guide is retained in the tire.

5. The method of claim 1 including:
(a) providing the enlarged piercing head with an exterior screw thread,
(b) providing an enlarged hollow shaft having an exterior screw thread and adapted for attachment at one end to a rotary drive,
(c) inserting the air guide freely into the hollow shaft with the enlarged piercing head abutting the end of the shaft opposite the rotary drive,
(d) engaging the enlarged piercing head against the tire while rotating the drive in the direction to screw the head and shaft into the tire from the outer side thereof adjacent the wheel flange area to the bead area, and
(e) reversing the rotation of the drive to retract the shaft, whereby the air guide is retained in the tire.

6. An air guide for venting the bead area of a pneumatic tire, comprising:
(a) an elongated flexible member having an enlarged piercing head at one end thereof,
(b) said head providing an abutment for a tool for inserting the air guide, enlarged piercing head first, into a pneumatic tire from the outer side thereof to the bead area to be vented, the elongated flexible member rearward of the enlarged piercing head being arranged to vent air from the bead area of a tire outwardly to the atmosphere.

7. The air guide of claim 6 wherein the elongated flexible member comprises a plurality of strands of flexible material bonded to the enlarged piercing head.

8. The air guide of claim 6 wherein the enlarged piercing head tapers forwardly to a point and has a plurality of outwardly projecting stops on its outer surface and a rearward connector portion arranged for engagement by one end of an elongated hollow rotary screw shaft for rotation with the screw shaft in an inserting direction and for disengagement from the screw shaft in the opposite, retracting direction of rotation of the screw shaft.

9. The air guide of claim 8 wherein the stops are segments of screw threads.

10. The air guide of claim 8 wherein the connector portion of the enlarged piercing head comprises a rearwardly extending shank provided with a screw thread matching a screw thread on said one end of the rotary screw shaft.

11. A tool for inserting into the bead area of a pneumatic tire an elongated flexible air guide having an enlarged piercing head on one end thereof, the tool comprising an elongated hollow shaft arranged to receive freely therein the elongated flexible air guide, with one end of the shaft abutting the enlarged piercing head, the shaft being arranged for insertion, with the enlarged piercing head first, into a pneumatic tire from the outer side adjacent the wheel flange area to the bead area to be vented, and then to be retracted from the tire, whereby the air guide is retained within the tire, extending from the bead area to the outer side of the tire, the end of the shaft opposite the head-abutting end being arranged for connection to a rotary drive, a screw thread on the outer surface of the shaft for screwing the shaft into a tire and unscrewing the shaft from the tire, and connector means on the head-abutting end of the shaft arranged to engage the enlarged piercing head for rotation with the shaft during screwing of the shaft into the tire and to disengage from the head during unscrewing of the shaft from the tire.

12. The tool of claim 11 wherein the connector means comprises a threaded portion on the head-abutting end of the shaft for releasable engagement with a threaded portion on the enlarged piercing head of the air guide.

* * * * *